United States Patent [19]
Enomoto

[11] Patent Number: 5,382,982
[45] Date of Patent: Jan. 17, 1995

[54] TELEVISION RECEIVER WITH MULTIPLE INPUTS AND OUTPUTS FOR AUTOMATICALLY SWITCHING BETWEEN INPUTS

[75] Inventor: Keiji Enomoto, Tokyo, Japan
[73] Assignee: Sony Corporation, Tokyo, Japan
[21] Appl. No.: 247,509
[22] Filed: May 23, 1994

Related U.S. Application Data

[63] Continuation of Ser. No. 984,669, Dec. 2, 1992.

[30] Foreign Application Priority Data

Dec. 6, 1991 [JP] Japan .................. 3-322989

[51] Int. Cl.⁶ .................. H04N 5/44; H04N 5/268
[52] U.S. Cl. .................. 348/706; 348/553; 348/725
[58] Field of Search ............... 348/706, 705, 553, 554, 348/552, 604, 725, 731, 732, 722, 634, 555, 558, 563, 565; H04N 5/222, 5/44, 5/268, 5/262; 360/61, 62, 9.1

[56] References Cited

U.S. PATENT DOCUMENTS

| | | | |
|---|---|---|---|
| 3,869,564 | 3/1975 | Colodny | 358/181 |
| 4,151,557 | 4/1979 | Iida et al. | 358/188 |
| 4,272,784 | 6/1981 | Saito et al. | 358/127 |
| 4,460,918 | 7/1984 | Flasza | 358/181 X |
| 4,502,026 | 2/1985 | Imazeki et al. | 358/181 X |
| 4,821,122 | 4/1989 | Teskey | 358/181 |
| 5,010,400 | 4/1991 | Oto | 358/191.1 X |
| 5,161,019 | 11/1992 | Emanuel | 358/191.1 X |

FOREIGN PATENT DOCUMENTS

| | | | |
|---|---|---|---|
| 300193 | 7/1987 | European Pat. Off. | H04N 5/445 |
| 57-005474 | 1/1982 | Japan | 358/181 |
| 61111079 | 11/1984 | Japan | H04N 5/44 |
| 60-246190 | 12/1985 | Japan | 358/181 |
| 61-004329 | 5/1986 | Japan | H04B 1/18 |
| 63-253776 | 10/1988 | Japan | H04N 5/268 |
| 2193468 | 7/1990 | Japan | H04N 5/268 |
| 3231582 | 10/1991 | Japan | 358/181 |
| 5808457 | 6/1993 | Japan | H04N 5/44 |

Primary Examiner—James J. Groody
Assistant Examiner—Safet Metjahic
Attorney, Agent, or Firm—Jay H. Maioli

[57] ABSTRACT

The present invention is directed to a television receiver in which, even when a broadcasting of a broadcasting station received and reproduced at an image display unit is ended and a non-signal state is presented, a video signal can be protected from being disturbed. This television receiver comprises a first video signal receiving apparatus, a second video signal receiving apparatus, an image display unit supplied with an output video signal from the first video signal receiving apparatus, and a circuit for supplying an output video signal of the second video signal receiving apparatus as an external output, wherein when the output video signal of the first video signal receiving apparatus is set in the non-signal state, the output video signal of the second video signal receiving apparatus is automatically supplied to the image display unit.

4 Claims, 2 Drawing Sheets

TELEVISION RECEIVER WITH MULTIPLE INPUTS AND OUTPUTS FOR AUTOMATICALLY SWITCHING BETWEEN INPUTS

This is a continuation of application Ser. No. 07/984,669 filed Dec. 2, 1992.

BACKGROUND OF THE INVENTION

1. Field of the Invention

The present invention relates to television receivers and, more particularly, to a television receiver which can receive a satellite television broadcasting and a VHF (very high frequency) and UHF (ultra high frequency) television broadcasting simultaneously.

2. Description of the Prior Art

FIG. 1 of the accompanying drawings shows an example of a previously-proposed television receiver which can simultaneously receive a satellite television broadcasting and a VHF and UHF television broadcasting.

In FIG. 1, reference numeral 1 depicts a VHF and UHF television broadcasting receiving apparatus which includes VHF and UHF tuners, an intermediate frequency amplifying circuit, a detector circuit or the like, though not shown. A video signal of VHF or UHF television broadcasting developed at the output side of the VHF and UHF television broadcasting receiving apparatus 1 is supplied to one fixed contacts 2b and 3b of change-over switches 2 and 3.

In FIG. 1, reference numeral 4 depicts a satellite television broadcasting receiving apparatus which includes satellite television broadcasting receiving converter, a tuner, an intermediate frequency amplifying circuit, a detector circuit or the like, though not shown. A video signal of the satellite television broadcasting developed at the output side of the satellite television broadcasting receiving apparatus 4 is supplied to the other fixed contacts 2c and 3c of the change-over switches 2 and 3. A video signal developed at a movable contact 2a of the change-over switch 2 is supplied to a video signal processor circuit 5 and synchronizing and deflecting circuit 6, both of which construct an image display unit. An output signal from the video signal processor circuit 5 is supplied to a cathode ray tube (CRT) 7, and a deflection or the like is performed by using an output signal from the synchronizing and deflecting circuit 6. Then, a picture of this video signal is displayed on the cathode ray tube 7.

The video signal developed at a movable contact 3a of the change-over switch 3 is supplied to an external output unit 8, such as a pin jack or the like that supplies a video signal to a video tape recorder, an external monitor display or the like.

In the television receiver shown in FIG. 1, by connecting the movable contact 2a of the change-over switch 2 to one and the other fixed contacts 2b and 2c, pictures of the VHF and UHF television broadcastings and the satellite television broadcasting can be selectively displayed on the cathode ray tube 7 so that the viewer can watch a desired television broadcasting.

Further, by selectively connecting the movable contact 3a of the change-over switch 3 to one and the other fixed contacts 3b and 3c, the video signals of the VHF and UHF television broadcastings and the video signal of the satellite broadcasting are selectively supplied to the external output unit 8 to which the video tape recorder or the like is connected. Therefore, the viewer can record a video signal of a desired television broadcasting.

Furthermore, in the television receiver shown in FIG. 1, the video signal of the satellite television broadcasting or the VHF and UHF television broadcasting can be simultaneously recorded via the external output unit 8 while a picture of a video signal of the VHF and UHF television broadcasting or satellite television broadcasting is being received and reproduced on the cathode ray tube 7.

The conventional television receiver shown in FIG. 1, however, suffers from the following disadvantage. That is, if a broadcasting of a desired station of the VHF and UHF television broadcasting is finished and no video signal is received while the video signal of a desired station of the satellite television broadcasting is recorded by the video tape recorder (not shown) connected to the external output unit 8 and a video signal of a desired station of the VHF and UHF television broadcasting is received by the cathode ray tube 7, then an oscillator in the synchronizing and detecting circuit 6 of the video display unit is freely oscillated and a noise signal caused by this free oscillation of the oscillator is mixed into the video signal of the external output unit 8. Consequently, the video signal from the external output unit 8 is disturbed by this noise signal.

OBJECTS AND SUMMARY OF THE INVENTION

Therefore, it is an object of the present invention to provide an improved television receiver in which the aforesaid shortcomings and disadvantages of the prior art can be eliminated.

More specifically, it is an object of the present invention to provide a television receiver in which, when a broadcasting of a broadcasting station received and reproduced at an image display unit is ended and a non-signal state is presented, a video signal output from an external output unit can be protected from being disturbed.

It is another object of the present invention to provide a television receiver which can simultaneously receive a satellite television broadcasting and VHF and UHF broadcasting.

According to an aspect of the present invention, there is provided a television receiver which comprises a first video signal receiving apparatus, a second video signal receiving apparatus, an image display unit supplied with an output video signal from the first video signal receiving apparatus, and a circuit for supplying an output video signal of the second video signal receiving means as an external output, wherein when the output video signal of the first video signal receiving means is set in the non-signal state, the output video signal of the second video signal receiving means is automatically supplied to the image display unit.

The above and other objects, features, and advantages of the present invention will become apparent from the following detailed description of an illustrative embodiment thereof to be read in conjunction with the accompanying drawing, in which like reference numerals are used to identify the same or similar parts.

DETAILED DESCRIPTION OF THE PREFERRED EMBODIMENT

Figure 1:
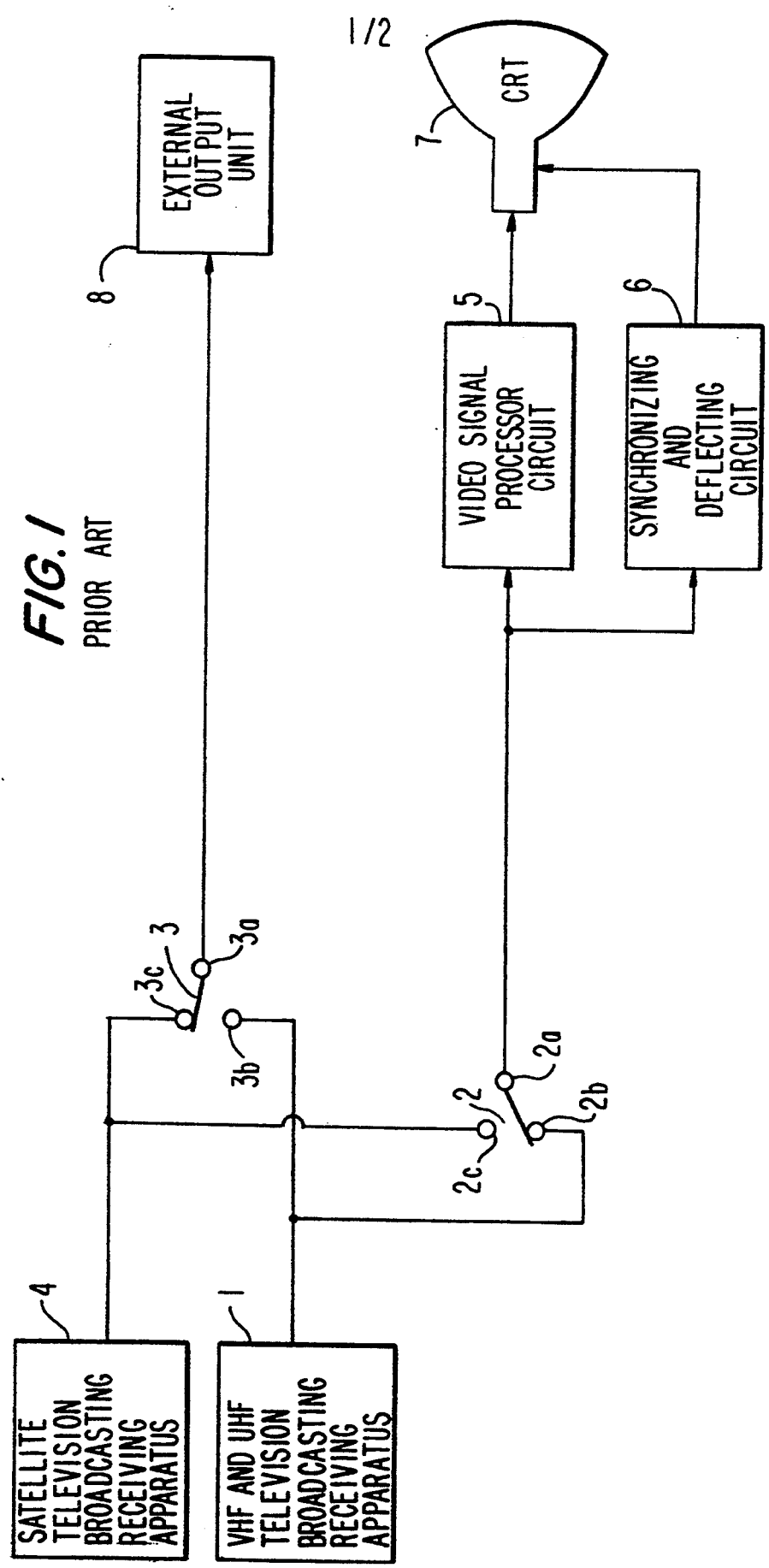
FIG. 1 is a block diagram showing an example of a conventional television receiver.
Figure 2:
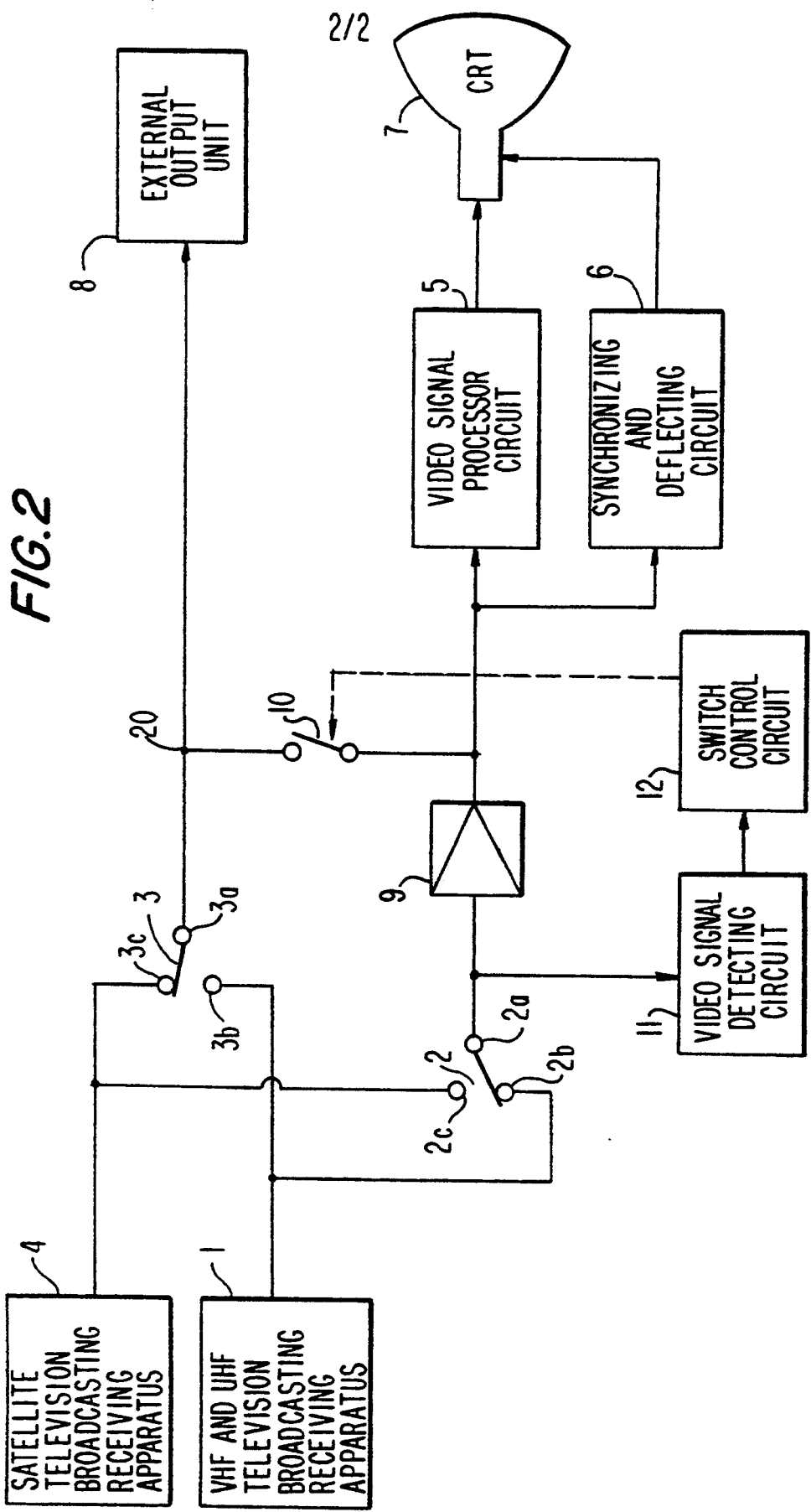
FIG. 2 is a block diagram showing a television receiver according to an embodiment of the present invention.

A television receiver according to an embodiment of the present invention will hereinafter be described with reference to FIG. 2. In FIG. 2 of the accompanying drawings, elements and parts identical to those of FIG. 1 are marked with the same references and therefore need not be described in detail.

According to this embodiment, as shown in FIG. 2, a video signal output from the VHF and UHF television broadcasting receiving apparatus 1 is supplied to one fixed contacts 2b, 3b of the change-over switches 2, 3. An output signal from the satellite television broadcasting receiving apparatus 4 is supplied to the other fixed contacts 2c, 3c of the change-over switches 2, 3.

A video signal developed at the movable contact 2a of the change-over switch 2 is supplied through a buffer circuit 9 to the video signal processor circuit 5 and the synchronizing and deflecting circuit 6 constructing the video display unit. An output signal from the video processor circuit 5 is supplied to the cathode ray tube 7 and deflected on the basis of the output signal from the deflecting circuit 6 so that a picture based on this video signal is displayed on the cathode ray tube.

The video signal developed at the movable contact 3a of the change-over switch 3 is supplied to the external output unit 8, such as the pin-jack or the like, from which the video signal developed at the movable contact 3a of the change-over switch 3 is supplied to the video tape recorder, the external monitor or the like.

According to this embodiment, a connection switch 10 is connected between a junction 20 between the movable contact 3a of the change-over switch 3 and the output side of the buffer circuit 9. A video signal developed at the movable contact 2a of the change-over switch 2 is supplied to a video detecting circuit 11 which detects the existence of this video signal. This video signal detecting circuit 11 generates an output signal when the video signal is lost and the non-signal state is presented. This output signal is supplied to a switch control circuit 12, and at that time, the connection switch 10 is closed by the switch control circuit 12. The connection switch 10 is a normally-open type switch. A rest of arrangement is similar to those of FIG. 1.

Since the television receiver according to this embodiment is constructed as described above, the movable contact 2a of the change-over switch 2 is selectively connected to one and the other fixed contacts 2b and 2c of the change-over switch 2, whereby VHF and UHF television broadcastings and the satellite television broadcasting can be selectively received and reproduced on the cathode ray tube 7. Therefore, the viewer can watch a desired television broadcasting.

Further, the movable contact 3a of the change-over switch 3 is selectively connected to one and the other fixed contacts 3b and 3c, whereby the video signal of the VHF and UHF television broadcasting and the video signal of the satellite television broadcasting can be selectively supplied to the external output unit 8 to which the video tape recorder or the like is connected. Therefore, a video signal of a desired television broadcasting can be recorded.

Furthermore, according to the television receiver of this embodiment, while the VHF and UHF television broadcasting or satellite broadcasting is received and reproduced on the cathode ray tube 7, the video signal of the satellite television broadcasting or video signal of VHF and UHF television broadcasting can be simultaneously recorded via the external output unit 8.

According to the embodiment of the present invention, the movable contact 2a of the change-over switch 2 is connected to one fixed contact 2b and the movable contact 3a of the change-over switch 3 is connected to the other fixed contact 3c, whereby the video signal of a desired station of the satellite television broadcasting can be recorded by the video tape recorder through the external output unit 8. Also, when the video signal of desired station of the VHF and UHF television broadcastings is received and reproduced on the cathode ray tube 7, if the broadcasting of the desired station of the VHF and UHF television broadcasting is ended and the non-signal state is presented, then this non-signal state is detected by the video signal detecting circuit 11 and the connection switch 10 is closed. At that time, the video signal of the desired station of the satellite television broadcasting from the external output unit 8 is supplied to the video signal processor circuit 5 and the synchronizing and deflecting circuit 6. The video signal processor circuit 5, the synchronizing and deflecting circuit 6 and the cathode ray tube 7 are operated in synchronism with the video signal derived from the external output unit 8 so that the video signal processor circuit 5, the synchronizing and deflecting circuit 6 and the cathode ray tube 7 can be prevented from disturbing the video signal derived from the external output unit 8. Conversely, when the video signal of the desired station of the satellite television broadcasting is received and reproduced on the cathode ray tube 7 and the video signal of the desired station of the VHF and UHF television broadcastings is output from the external output unit 8, the television receiver of the present invention is operated similarly as described above.

In this case, a picture of the video signal output from the external output unit 8 is received and reproduced on the cathode ray tube 7. When such a picture need not be displayed, other portions than the synchronizing signal of this video signal are processed in a blanking fashion.

According to this embodiment, since the video signal output from the external output unit 8 is supplied to the image display unit, there is then the advantage such that a design of substrate, a wire treatment, a shielding treatment can be carried out with ease.

While the television receiver includes the two television broadcasting receiving apparatus as described above, the present invention is not limited thereto and may be similarly applied to a television receiver which includes three television broadcasting receiving apparatus or more.

According to the present invention, even when the broadcasting of the broadcasting station received at the image display unit is ended and the non-signal state is presented, the video signal output from the external output unit can be prevented from being disturbed.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A television receiver comprising:
   first video signal receiving means for producing a first video output signal;
   second video signal receiving means for producing a second video output signal;
   an image display unit including a synchronizing and deflecting circuit;
   a first change-over switch having first and second states for supplying, in the first, said first video output signal to an external output and, in the second state, said second video output signal to the external output;
   a second change-over switch having first and second states for supplying, independently of the state of the first change-over switch, said first video output signal to said image display unit in the first state and said second video output signal to the image display unit in the second state;
   a connection switch provided between an output of said second change-over switch and an output of said first change-over switch;
   a video signal detecting circuit connected to an output of said second change-over switch; and
   a switch control circuit controlling said connection switch in response to a control signal output from said video signal detecting circuit;
   wherein when an output video signal from said second change-over switch is not detected by said video signal detecting circuit said switch control circuit causes said connection switch to connect said image display unit and said output of said first change-over switch.

2. The television receiver according to claim 1, wherein said image display unit is formed of a video signal processor circuit, a synchronizing and deflecting circuit, and a cathode ray tube.

3. The television receiver according to claim 1, wherein said first video signal receiving means receives a video signal of VHF and UHF television broadcasting and said second video signal receiving means receives a video signal of satellite television broadcasting.

4. The television receiver according to claim 1, wherein a video tape recorder or external monitor receiver is connected to the external output.

* * * * *

UNITED STATES PATENT AND TRADEMARK OFFICE
CERTIFICATE OF CORRECTION

PATENT NO. : 5,382,982

DATED : January 17, 1995

INVENTOR(S) : Keiji Enomoto

It is certified that error appears in the above-indentified patent and that said Letters Patent is hereby corrected as shown below:

Col. 5, line 12, after "first" first occurrence, insert --state--

Signed and Sealed this

Sixteenth Day of July, 1996

Attest:

BRUCE LEHMAN

Attesting Officer    Commissioner of Patents and Trademarks